United States Patent [19]
Bowman

[11] Patent Number: 4,856,024
[45] Date of Patent: Aug. 8, 1989

[54] DATA TRANSCEIVING MODEM

[75] Inventor: George A. Bowman, Lake, Ill.

[73] Assignee: Honeywell Inc., Minneapolis, Minn.

[21] Appl. No.: 39,830

[22] Filed: Apr. 16, 1987

Related U.S. Application Data

[63] Continuation of Ser. No. 313,441, Oct. 21, 1981, abandoned, which is a continuation of Ser. No. 53,872, Jul. 2, 1979, abandoned.

[51] Int. Cl.[4] .............................................. H04B 1/54
[52] U.S. Cl. .......................................... 375/8; 455/79; 455/339; 332/9 T
[58] Field of Search ............... 375/7, 8, 36; 455/73, 455/78, 79, 82, 84, 339; 370/24, 27, 29, 31, 32; 379/93, 97, 98; 332/9 T, 31 T

[56] References Cited

U.S. PATENT DOCUMENTS

| | | | |
|---|---|---|---|
| 3,141,929 | 7/1964 | George | 375/61 |
| 3,292,178 | 12/1966 | Magnuski | 375/7 |
| 3,517,129 | 6/1970 | Talcott | 375/8 |
| 3,626,406 | 9/1969 | Iritani | 375/36 |
| 3,674,922 | 7/1972 | Salaman et al. | 375/8 |
| 3,764,977 | 10/1973 | Weeden, Jr. | 375/8 |
| 3,783,194 | 1/1974 | Vilips et al. | 375/8 |
| 3,937,882 | 2/1976 | Bingham | 375/8 |
| 4,092,599 | 5/1978 | Yee et al. | 375/8 |
| 4,229,827 | 10/1980 | Bowman | 375/8 |

FOREIGN PATENT DOCUMENTS 2357118 3/1978 France ..................................... 375/7

OTHER PUBLICATIONS

Electronic Design 17, Aug. 16, 1973, pp. 44–54.
Electronics, vol. 51, No. 19, Sep. 14, 1978, p. 48.

*Primary Examiner*—Benedict V. Safourek
*Attorney, Agent, or Firm*—Donald J. Lenkszus

[57] ABSTRACT

A modem for transmitting and receiving digital information includes an oscillator, a switch connected to both the oscillator and to a data input for switchably controlling the oscillator to impress data on a transmission channel, and a receiver also connected to the transmission channel for receiving data thereon to demodulate the data and supply it to a processor.

18 Claims, 1 Drawing Sheet

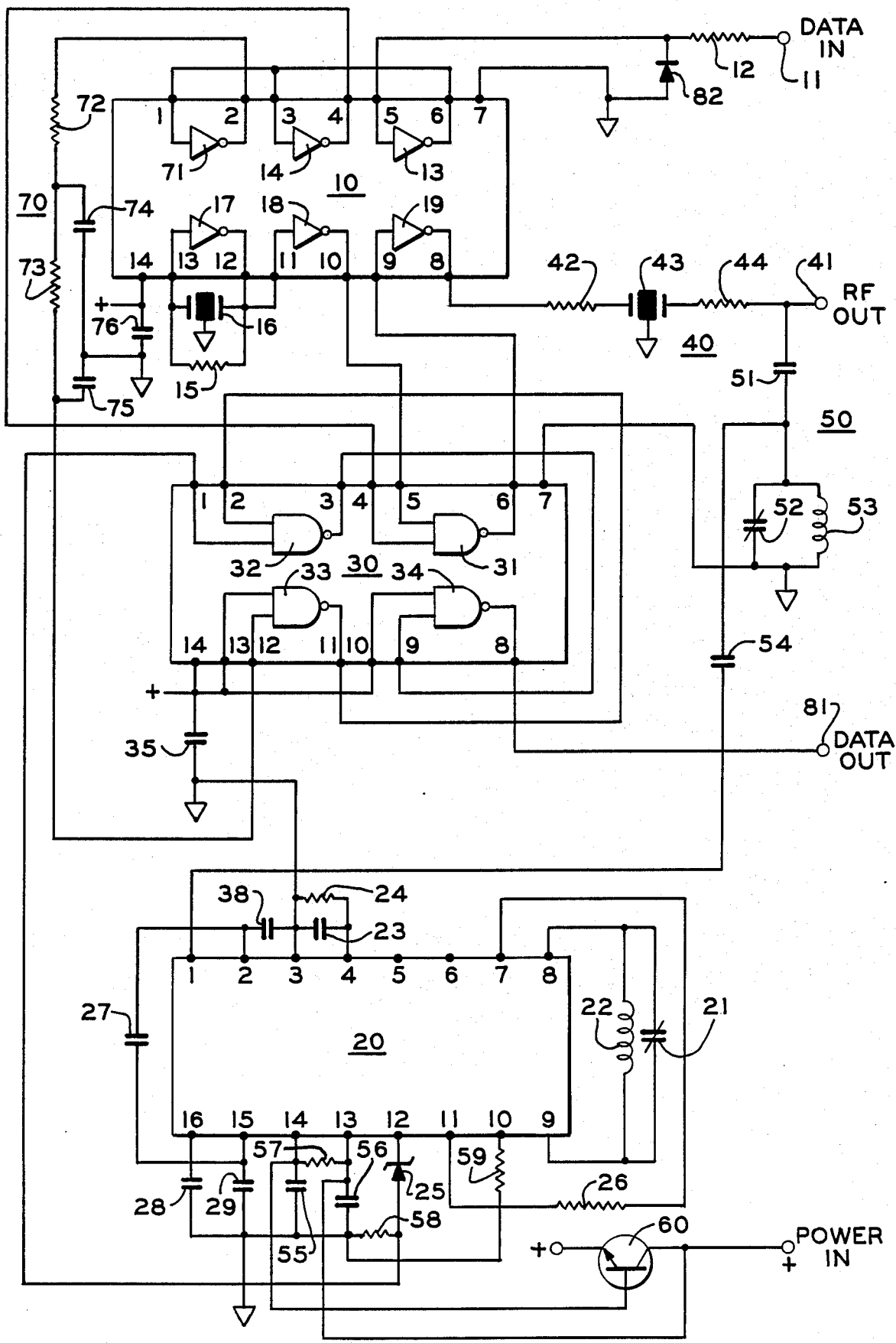

DATA TRANSCEIVING MODEM

This application is a continuation of application Ser. No. 313,441 filed Oct. 21, 1981 which is a continuation of application Ser. No. 053,872 filed July 2, 1979, both now abandoned.

BACKGROUND OF THE INVENTION

The present invention relates to modems for transmitting and receiving data over a transmission channel and, more particularly, to a simple and inexpensive modem which will make feasible the low cost transmission of such data.

As opposed to twisted pair or wireless transmission channels, a coaxial transmission channel offers greater noise immunity, greater enhanced capacity, self-powering capability, stability, single entity distribution, and the possibility of coexistent multi-purpose modulation schemes. Coaxial transmission channel allocations are not subject to governmental regulations as are wireless transmission channels and they require less circuit complexity and result in improved security from interference in eavesdropping. To achieve these advantages of coaxial transmission channels, however, it is necessary to preserve cable environmental integrity, reliability and data transmission transparency from interference.

As the data processing and transmission industry seeks a universal transmission medium, there must be considered such diverse criteria as topology, reliability, integrity, security, safety, flexibility, standards, environment, functionality, redundancy, and, perhaps the most important, cost. Recent integration of RF circuitry which allow both adequate performance and cost effectiveness have provided the building blocks which can be used to make reliable, low cost, universal modems.

Thus, the modem according to the present invention is comprised of only three active integrated circuits - the transmitter, the receiver, and the switch/interface network. This modem acts as a half-duplex transparent medium between peripheral devices over the coaxial transmission line. The data is preserved as an envelope on the RF waveform without the conditioning of Manchester, diphase or any additional error correcting codes.

SUMMARY OF THE INVENTION

The modem for transmitting and receiving digital information according to the present invention includes a data input terminal for receiving data to be transmitted, a channel terminal for supplying data to a transmission channel, an oscillator, a switch connected to both the data input terminal and the oscillator for modulating data for supply to the transmission channel, a data output terminal for supplying received data to a processor or the like, and a receiver connected to the channel terminal and to the data output terminal for demodulating the received data and supplying the demodulated received data to the data output terminal.

BRIEF DESCRIPTION OF THE DRAWINGS

These and other features and advantages will become more apparent from a detailed consideration of the invention when taken in conjunction with the single FIGURE of the drawing which shows the modem according to the present invention.

DETAILED DESCRIPTION

The modem shown in the drawing comprises basically three active integrated circuits—the transmitter 10 in the form of a 74LS04 hex inverter, a receiver 20 in the form of a TDA440 AM receiver, and switch/interface 30 in the form of a 74LS00 quad NAND gate. Data input terminal 11 receives data to be transmitted and is connected through resistor 12 and through two series connected buffer inverters 13 and 14 to one input of NAND gate switch 31. An oscillator, in the form of parallel connected resistor 15, ceramic filter 16 and inverter 17, is connected through buffer inverter 18 to the other input of NAND gate switch 31. The NAND gate 31 amplitude modulates the signal from inverter 18 with data from invertre 14. The output from NAND gate 31 is buffered by inverter 19 and connected through filter section 40 to channel terminal 41. Filter section 40 comprises the series connection of resistor 42, ceramic filter 43 and resistor 44. Since the output from switch 31 through inverter 19 is rich in the harmonics of the basic frequency supplied by oscillator 15-17, filter 40, whose ceramic filter 43 is matched in frequency to ceramic filter 16, hard limits all harmonics to the envelope of the filter. Thus, the carrier frequency supplied to channel terminal 41 matches the frequency supplied by oscillator 15-17.

Channel terminal 41 is connected to a transmission channel to which similar modems are connected. The signal supplied to the transmission channel is received at a head end which converts the first carrier frequency to a second carrier frequency to which the receive side, receiver 20, is tuned.

Thus, the data received by the modem in the drawing is connected through a selective resonant network 50 comprising capacitor 51 connected on one side to channel terminal 41 and on its other side to the parallel network of capacitor 52 and inductor 53 the other side of which network is connected to ground. The junction of capacitor 51 and the parallel network 52-53 is connected through capacitor 54 to pin 1, the input pin, of receiver 20. In receiver 20, the data signal is amplified and applied to a resonator connected across pins 8 and 9 and comprised of the parallel combination of capacitor 21 and inductor 22. Pins 2 and 3 are connected together through bypass capacitor 38 and pins 3 and 4 are connected together through the parallel combination of capacitor 23 and resistor 24. Thus, the carrier is switched or rectified for feedback to an automatic gain control network inherent in circuit 20. The time constant of the automatic gain control is determined by capacitor 23 and resistor 24. Receiver 20 demodulates the data received at pin 1 and supplies the demodulated signal at pin 12 where the demodulated signal is applied to zener diode 25 for TTL compatible level shifting. Other elements of receiver 20 include a gain control resistor 26 connected between pins 7 and 11, bypass capacitor 27 connected between pin 2 and pin 15, bypass capacitors 28, 29, 55 and 56 connected respectively from pins 16, 15, 14 and 13 to ground. Pins 14 and 13 are interconnected to the power supply through bleeder resistor 57 and pin 12 is connected through zener diode 25 and resistor 58 to ground. Furthermore, gain control resistor 59 connects pin 10 to ground. Supply pin 3 is also tied directly to ground. Transistor 60 has its collector connected to pin 13 and to a positive input voltage supply, its base connected to pin 14 and its emitter supplies voltage to pin 14 of transmitter 10 and switch/interface 30. Transistor 60 converts the 12 volt supply to a 5 volt supply. The demodulated output from receiver 20 is taken at the junction of zener diode 25 and resistor 58 and is connected to the first input of NAND gate 32 of switch/interface 30. The second input of NAND gate 32 is taken from the output of NAND gate 33 which has a first input tied to a positive source and a second input connected through delay network 70 from the output of inverter 71 which has its input tied to the data input terminal 11 through inverter 13. Delay network 70 comprises resistor 72 and resistor 73 series connected between the output of inverter 71 and the second input of NAND gate 33. Capacitors 74 and 75 are series connected across resistor 73 with the junction of these two capacitors connected to ground. Pin 14 of transmitter 10 is connected to a positive supply and also through capacitor 76 to ground from emitter 60. Delay network 70 receives the data applied to data input terminal 11 and delays this data by an amount dependent upon the delay which results from transmitting the data down the transmission channel, converting it to the second carrier frequency at the head end, and transmitting the data back along the transmission line to the modem shown in the Figure. This delayed data is then applied to the second input of NAND gate 33 and consequently to the second input of NAND gate 32 for blocking the received data supplied by receiver 20 to the first input of NAND gate 32. Thus, the modem will block data which it has transmitted along the transmission channel from its data output terminal 81 but will allow data from all other modems online to be presented to data output terminal 81.

The output from NAND gate 32 is buffered by NAND gate 34 before data from it is supplied to data output terminal 81. Pin 14 of switch/interface network 30 is connected to the positive supply from emitter 60 and it is also connected to ground through bypass capacitor 35. Pin 7 of switch/interface 30 is connected to ground as is pin 7 of transmitter 10. The junction of resistor 12 and pin 5 of transmitter 10 is connected to ground through the reverse junction of signal clipping diode 82.

Thus, a simple modem is provided which can be arranged in a very small package and comprises very few parts. The modem provides proper filtering to insure that it transmits a frequency which will be recognized by the head end and will recognize the proper frequency transmitted by the head end. The modem also blocks data from the data output terminal data which the modem has transmitted itself. In some instances such a function may not be desirable for reasons of an automatic loopback feature. Such a feature is obtained by connecting pin 12 of switch network 30 to ground potential. In the preferred embodiment the ceramic filters used are Murate SFE 10.7MS2-Z units providing for operation between a transmit frequency of 10.7 MHz and receive frequency of 53.1 MHz.

The embodiments of the invention in which an exclusive property or right is claimed are defined as follows:

1. A modem for transmitting and receiving digital information comprising:
   data input terminal means for receiving digital data to be transitted;
   channel terminal means for supplying modulated digital data signals to a transmission channel;
   an oscillator providing an oscillator output signal;
   switch means connected to said data input terminal means, said oscillator and said channel terminal means for modulating said oscillator output signal and for connecting said modulated digital data signals to said channel terminal means;
   data output terminal means; and,
   receiver means connected to said channel terminal means and to said data output terminal means for demodulating received modulated digital data signals into received digital data and supplying said received digital data to said data output terminal means,
   said switch means including blocking means connected to said data input terminal means and to said receiver means, said blocking means including a delay network for delaying, within said modem, input data which has been transmitted by said modem, said delay of said delay network matching the delay of said transmission channel, and said blocking means being responsive to said delayed input data for blocking from said data output terminal means received data which has been transmitted by said modem.

2. The modem of claim 1 wherein said oscillator comprises a ceramic filter.

3. The modem of claim 2 wherein said switch means has an output means connected to said channel terminal means, said output means comprising a ceramic filter tuned to substantially the same frequency as the ceramic filter of the oscillator.

4. The modem of claim 3 wherein said receiver means comprises a filter tuned to the frequency of the received data.

5. The modem of claim 4 wherein said switch means comprises a first NAND gate having a first input terminal connected to said oscillator, a second input terminal connected to said data input terminal means and an output connected to said output means.

6. The modem of claim 5 wherein said data input terminal means comprises two series connected inverters connected from a data input terminal to said first input terminal of said first NAND gate and said output means of said switch means comprises a third inverter connected between said output of said first NAND gate and said ceramic filter of said switch means.

7. The modem of claim 6 wherein said oscillator comprises a parallel combination of an invertor, said ceramic filter of said oscillator and a resistor, said parallel combination being connected to the second input of said first NAND gate through a further invertor.

8. The modem of claim 7 wherein said receiver comprises a demodulator having an input terminal connected to said filter of said receiver means, an output terminal connected to a first input terminal of a second NAND gate a second input terminal of which is connected to said blocking means, said second NAND gate having an output means connected to said data output terminal means.

9. The system of claim 8 wherein said delay network is arranged for delaying the application of data to said second NAND gate of said receiver means to block from said data output terminal means data which has been transmitted by said modem.

10. The modemof claim 9 wherein said blocking means further comprises an inverter having an input connected to an output of one of the inverters of said data input terminal means and having an output connected to an input of said delay network, said delay network having an output connected to an input of a third NAND gate an output of which is connected to said second input of said second NAND gate.

11. The modem of claim 1 wherein said blocking means further comprises an invertor having an input connected to said data input terminal means and having an output connected to an input of said delay network having an output connected to an input of a NAND gate an output of which is connected to said receiver means.

12. The modem of claim 11 wherein said receiver means comprises a NAND gate having a first input for receiving said received data, a second input connected to said output of said NAND gate of said blocking means, and an output means connected to said data output terminal means.

13. The modem of claim 12 wherein said switch means comprises a NAND gate having a first input terminal connected to said oscillator, a second input terminal connected to said data input terminal means, and an output means connected to said channel terminal means.

14. The modem of claim 1 wherein said switch means comprises a NAND gate having a first input terminal connected to said oscillator, a second input terminal connected to said data input terminal means, and an output means connected to said channel terminal means.

15. The modem of claim 14 wherein said data input terminal means comprises two series connected inverters connected from a data input terminal to said first input terminal of said NAND gate and said output means of said NAND gate comprises inverter means connected between an output terminal of said NAND gate and said channel terminal means.

16. The modem of claim 15 wherein said oscillator comprises a parallel combination of an invertor, a ceramic filter and a resistor, said parallel combination being connected to the second input of said NAND gate through a further invertor.

17. The modem of claim 1 wherein said receiver means comprises a filter tuned to the frequency of the received data.

18. The modem of claim 17 wherein said receiver comprises a demodulator having an input terminal connected to said filter of said receiver means, an output terminal connected to a first input terminal of a NAND gate a second input terminal of which is connected to said switch means, said NAND gate having an output means connected to said data output terminal means.

* * * * *